UNITED STATES PATENT OFFICE.

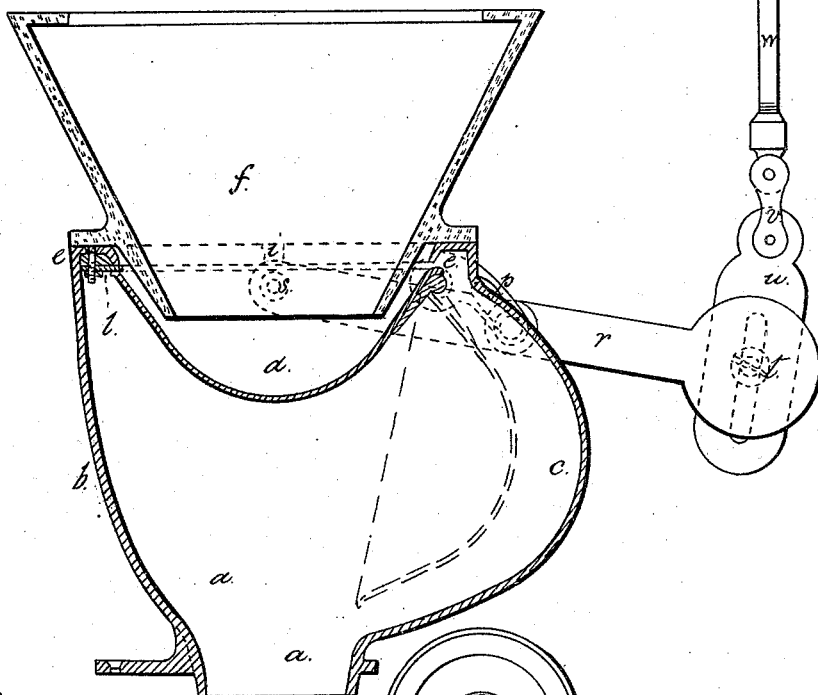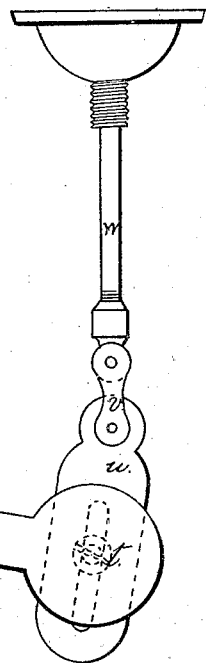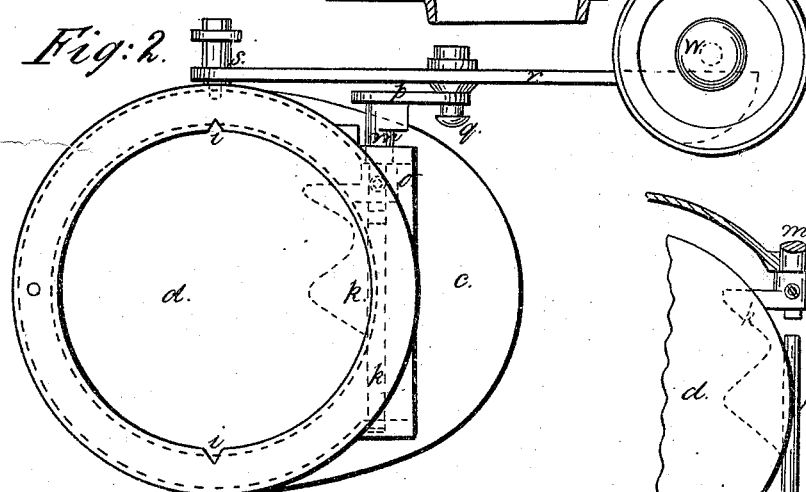

WILLIAM S. CARR, OF NEW YORK, N. Y.

IMPROVEMENT IN WATER-CLOSETS.

Specification forming part of Letters Patent No. 80,708, dated August 4, 1868.

*To all whom it may concern:*

Be it known that I, WILLIAM S. CARR, of the city and State of New York, have invented, made, and applied to use a certain new and useful Improvement in Water-Closets; and I do hereby declare the following to be a full, clear, and exact description of the said invention, reference being had to the annexed drawing, making part of this specification, wherein—

Figure 1 is a vertical longitudinal section of said closet. Fig. 2 is a plan of the same, the basin being removed; and Fig. 3 is a detached view of the axle of the pan.

Similar marks of reference denote the same parts.

In the construction of pan or valve water-closets it has heretofore been usual to have the cast-iron hopper or container formed with flaring sides that terminate as a flange, to which the top plate of the hopper is bolted. The swinging pan is put into place before the top plate is bolted on; hence, when repairs become necessary to the pan, as is frequently the case, the top plate of the container has to be removed. The nuts and bolts are usually rusty, and frequently the whole closet is so injured in getting at the pan for repairs or placing in a new one that it cannot be again used. Besides this, the joint between the hopper and its top plate has to be packed with putty, and openings therein are of frequent occurrence, allowing smell to escape, and the cost of the water-closet is largely increased by this mode of construction.

The nature of my said invention consists in a water-closet hopper or container formed with an opening at the top, of such a shape that the pan can be inserted from above, and turned around within the hopper, so as to set up beneath the inward flange around the upper end of said hopper or container, and swing upon the axis that projects through the said container.

By this construction the hopper can be formed of one piece or casting, and made much cheaper and tighter than heretofore, and the pan can be withdrawn for repairs, if required, without disturbing the hopper, and I mount the pan on an axis formed of two parts, that allows of its being introduced. I also employ an adjustable link between the pull and lever, that allows for variations in the position of the pull.

In the drawing, $a$ is the base of the hopper, with an opening to the soil-pipe. $b$ is the side of the hopper, which is almost vertical above the curved portion that unites with the base $a$. $c$ is the side of the hopper, that is swelled out sufficiently to contain the pan $d$ when tipped down into the position shown by red lines in Fig. 1, and $e$ is the contracted upper portion of the hopper, forming an inward flange for the basin $f$ to set upon. These portions $a$, $b$, $c$, and $e$ of the hopper are cast in one piece, so as to avoid packing and dispense with the nuts and bolts before employed.

The pan $d$ is of larger diameter than the opening in the flange $e$, so as to set up against the under side thereof, and in order to allow of its introduction or removal I provide notches at $i$ $i$ to pass the pan edgewise.

A piece of leather, attached by a screw and nut or a rivet, as seen at $l$, is employed for the edge of the pan to strike against in coming up nearly horizontal, so as to allow a space to remain for the overflow of surplus water.

The spindle or axis of the pan $d$ is made in two parts, the portion $k$ being a fixture on the pan, and being introduced into a cavity in the hopper at $l'$, the portion $m$ of said axis being entered through the hole at $n$ in the hopper into a squared socket, $o$, on the pan, where the parts are firmly secured by a screw; but by the removal of this screw the parts can be detached and the pan removed from the container or hopper.

At the outer end of the axis $m$ is the arm $p$, slotted to receive the roller or pin $q$ of the lever $r$ on the fulcrum $s$, and working as usual, except that the moving end is formed as a half-ball, with a screw, $t$, entering the slot of a link, $u$, from which a link, $v$, connects with the pull $w$. By moving the slotted link $u$ up or down on the screw $t$, the parts will be adjusted to accommodate the height of the seat, and by swinging the said link the parts will be adjusted to the position of the pull farther from or nearer to the basin.

What I claim, and desire to secure by Letters Patent, is—

1. A water-closet hopper or container having the inward flange $e$ at the upper end, in combination with the pan $d$, the parts being formed substantially as specified, so that the pan can be introduced or withdrawn through the opening in said flange $e$, and the pan, when in place, shall set up against the under side of said flange, as set forth.

2. The divided axis $k$ $m$, formed as shown, in combination with the pan $d$ and socket $o$, as and for the purposes set forth.

3. The slotted adjustable link $u$, in combination with the lever $r$ and pull $w$ $v$, as and for the purposes set forth.

In witness whereof I have hereunto set my signature this 23d day of November, 1867.

WILLIAM S. CARR.

Witnesses:
  CHAS. H. SMITH,
  GEO. D. WALKER.